United States Patent Office 3,519,218
Patented July 7, 1970

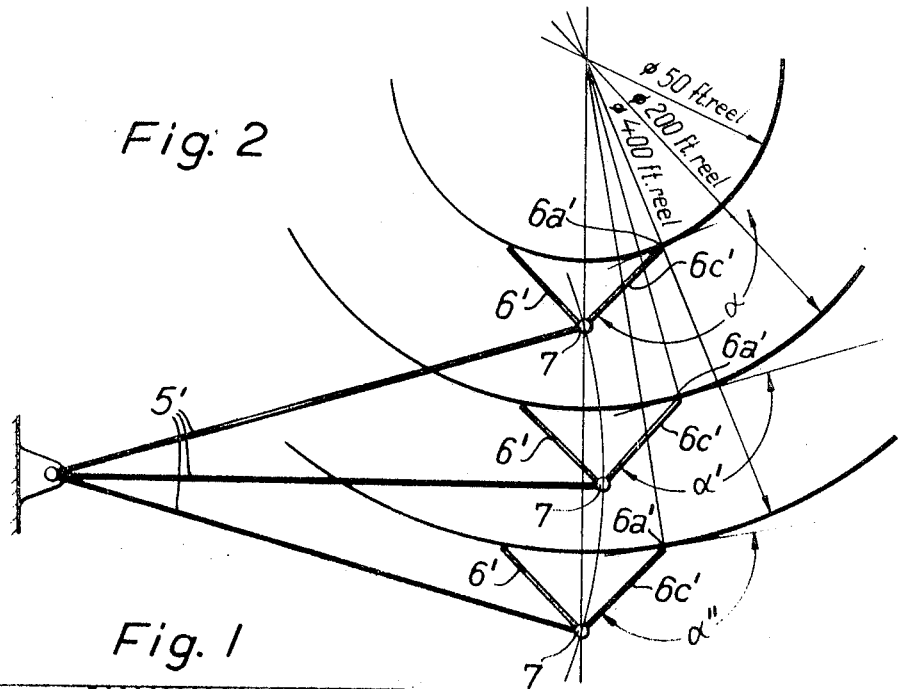
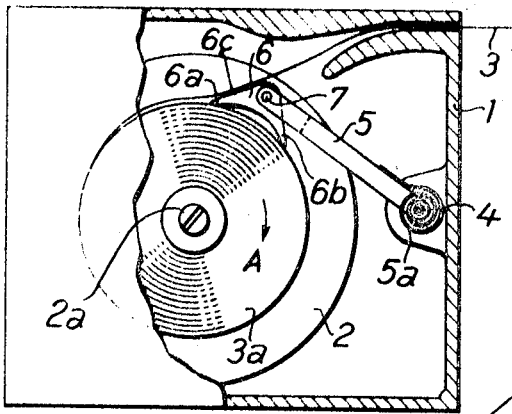
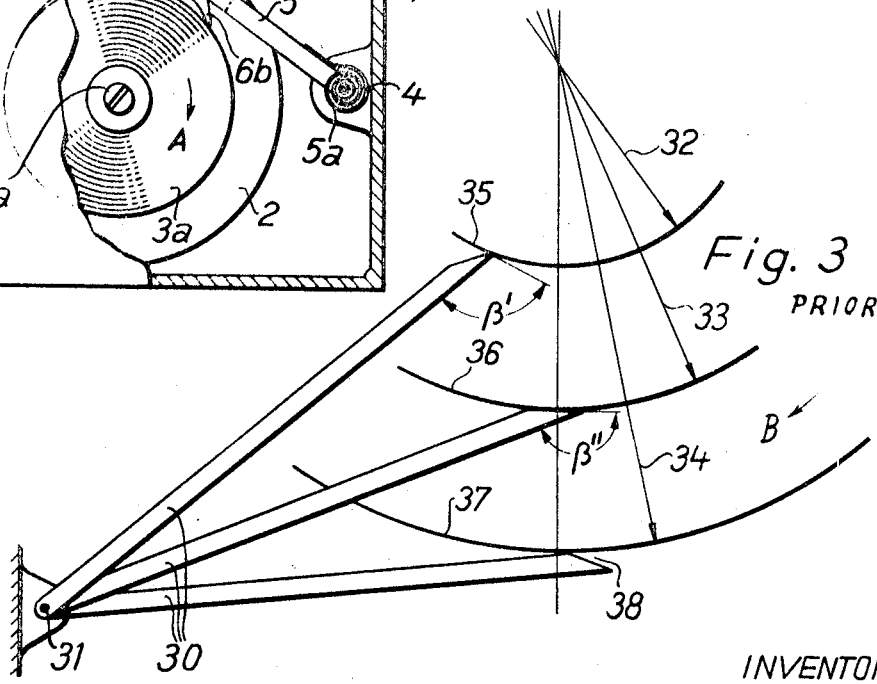

3,519,218
STRIPPER FOR A FILM OR TAPE END
Robert Mees, Wissmar, Kreis Wetzlar, Germany, assignor to Firma Ernst Leitz GmbH, Wetzlar, Germany
Filed Nov. 4, 1968, Ser. No. 772,937
Claims priority, application Germany, Nov. 11, 1967, 1,524,923
Int. Cl. B65h 27/00
U.S. Cl. 242—76          1 Claim

ABSTRACT OF THE DISCLOSURE

A pivotable one-armed lever having its pivot outside the circumference of a film or tape reel and being urged by resilient means between the flanges of the reel is at its end provided with a pivotable guide member. The guide member is basically of the shape of an isosceles triangle which is linked to the one-armed lever at the vertex of the triangle so that the ends of the triangle sides can simultaneously be brought into contact with the top winding of the film or tape coil. The outer surface of one side provides the guiding surface for the film or tape in such a manner that the angle between the guiding surface and the film or tape winding remains almost constant regardless of the coil diameter.

BACKGROUND OF THE INVENTION

Field of the invention

The present invention pertains to means adapted to strip the end of a film coil from the windings and to guide this end to the film advance means in a film projector.

It is, however, obvious that the application of the stripper is not limited to film coils alone, but can with equal advantage also be employed to tape coils as used in tape recorders.

Description of the prior art

It is already known to employ with film projectors a special device adapted to strip the film end from the coil on the supply reel and to guide and feed this end automatically to the film advance mechanism, usually a sprocket wheel.

The mentioned special device consists, as a rule, of a one-armed lever which is pivotally fastened for example to the projector housing, or, if the projector is to be used in combination with a cartridge, inside the latter.

The lever is usually given the shape of an oblong blade having a width that just fits between the flanges of the reel.

For the purpose of stripping the film end from the top winding of the coil, the lever is swung between the reel flanges until the end of the blade comes into contact with the film coil. Rotation of the film reel will then result in the film end hitting upon the lever after one revolution of the reel at the latest and in ascending of the film end along the guide way provided by the lever towards the film advance means.

However, there are a number of disadvantages inherent in this prior art device. The main disadvantage will become apparent when it is realized that the end of the lever has to be shaped in a wedge-like manner so as to enable the lever end to lie as flat as possible on the film in order to ensure safe stripping. The angle of the wedge remains, of course, always constant and it will be readily comprehended that the wedge-like lever end can only lie absolutely flat on the film coil if the coil is of one particular curvature, i.e. at one particular diameter. This means, with other words, that a flat contact of the lever with the coil will only exist if the angle subtended between the lever and the coil—better between the lever and the tangent on the coil circumference at the contact point of the lever with the coil—is always constant.

This condition, however, does not prevail if supply reels having film coils of different diameters are mounted on the projector or in the cartridge, as will be the case if at one time a 50 ft. reel is mounted and at another time a 400 ft. reel. Since the pivot of the lever is fixed and the length of the lever is always the same the angle between the lever and the coil will vary with the different coil diameters.

The latter proves particularly disadvantageous if a reel with a greater-than-average coil diameter is mounted, for example a 400 ft. reel, because in this case the lever will come into contact with the coil in a more outward position, as a consequence whereof the edge of the wedge-like lever end is lifted somewhat from the film coil. This produces a gap under the lever end into which the film end can easily slip instead of being pushed along the guide way provided by the lever. As a result, no stripping of the film end will take place, rather will the film end be caught and jammed below the lever.

Further, besides the forming of a slot below the lever end, it is an acknowledged fact that only one particular angle between lever and film coil is the most favourable one with regard to a smooth and safe stripping of the film. This angle depends on the type of the film material and on the film thickness, i.e. whether the film is more or less flexible, and can be determined empirically.

After this most favourable angle has been established it is of course desirable to maintain this angle at least approximately with coils of all possible diameters. However, with the prior art strippers this could not be done for reasons set forth above.

SUMMARY OF THE INVENTION

It is, therefore, an object of the invention to provide a guide member for the film end on a supply reel that together with the film coils subtends an angle which remains approximately constant regardless of the diameter of the coil from which the film end is to be stripped.

It is a further object to provide a guide member of the above described type which leaves the designer of the cartridge or projector a broad margin where to locate the pivot of the guide member without unfavourable influencing the desired angle.

According to the invention these objects are attained by pivotably linking a basically triangularly shaped guide member to the end of a one-armed lever. The guide member is fastened to the one-armed lever at the vertex of the triangle so that the two adjacent triangle sides will contact the top winding of the film coil simultaneously when the guide member is moved between the reel flanges.

It is the particular advantage of the pivotably mounted guide member that regardless of the coil diameter the triangularly shaped guide member always assumes a symmetrical position relative to the coil, as a consequence whereof the angle between the guide member sides and the circumference of the coil varies but little within narrow limits.

DESCRIPTION OF THE DRAWINGS

The invention will be more readily comprehended from the following description when taken in conjunction with the appending drawings, wherein:

FIG. 1 shows a cartridge for a film projector containing a film supply reel with the new stripper consisting of a guide member on the end of a one-armed lever, FIG. 2 shows schematically the function of the new stripper in three different positions, FIG. 3 shows the action of the prior art stripper in three different positions.

DESCRIPTION OF THE PREFERRED EMBODIMENT

Referring now to FIG. 1 the cartridge 1 which is adapted to be mounted on a film projector in conventional manner contains a film reel 2 of which only one flange is shown. Between the flanges the film 3 is wound to form a coil 3a; and film reel 2 and coil 3a are as a unit rotatable about the axis 2a.

A one-armed lever 5 is stationary but pivotably secured to the inner wall of cartridge 1 and is urged by a spring 5a between the flanges of reel 2.

To the end of lever 5 is pivotably linked the guide member 6 which is of triangular shape with the base being placed adjacent the film coil 3a. One flank 6c serves as the guiding surface for the film 3 and both flanks together with the curved base form the edges 6a, 6b. Although not particularly shown, the width of guide member 6 is such that it fits well into the room left between both flanges of reel 2.

From the foregoing description it will readily be understood that in a cartridge comprising the above mentioned elements the film end will, upon rotation of reel 2 in the direction of arrow A, be stripped from the film coil and will be guided by flank 6c towards the mouth of the cartridge, close to which the film advance sprocket is arranged (not shown). This stripping will occur during the first complete revolution of reel 2.

From the illustration in FIG. 1 it will also be plain that the angle between flank 6c and film coil 3a is approximately the same regardless of the diameter of the coil from which the film end is to be stripped. FIG. 3 shows, however, that this is not the case with the simple film strippers of the prior art. The guide rail 30 in FIG. 3 is pivotable about a pin 31 in the cartridge or projector housing (not shown). The arrows 32, 33, 34 indicate the different diameters in actual size of three different film coils on 50 foot-, 200 foot-, and 400 foot-reels, designated by the numerals 35, 36, 37 respectively. From this drawing it can be seen that the angles $\beta'$ and $\beta''$ do vary in dependence on the coil diameter.

Further, it will be understood that a gap 38 forms under the wedge-like end of guide rail 30 if, for example, a 400 foot reel is used on the projector. The film end, being rotated in the direction of arrow B, will become caught in gap 38, thus causing the film to be jammed. Only with an average-size film reel, for example a 200 feet reel, the guide rail will rest flat on the film coil, while with a smaller-size reel the guide rail forms a smaller angle with the film coil, as a consequence whereof the film end has to climb along a rather steeply inclined rail.

The improvement of the invention over the prior art is shown in FIG. 2. The end of one-armed lever 5' does not rest directly on the film coil, rather is the lever end provided with the schematically illustrated guide member 6' which is pivotably hinged on lever 5'. Guide member 6' is a bent-over member which is basically of the shape of an isosceles triangle being pivotably mounted to lever 5' at the vertex of the triangle. From FIG. 2 it can be seen that the three angles $\alpha$, $\alpha'$ and $\alpha''$ are almost identical and do change only very little with different coil diameters. The advantage being that the forming of a gap below the flank 6c' is avoided and the film ends from coils of all diameters have to climb along the guiding flank 6c' at the same angle.

Particularly from FIG. 2 it will be realized that the actual shape of guide member 6 in FIG. 1 is of minor importance with regard to the desired function as long as the lines from the pivot 7 to the edges 6a, 6b form an isosceles triangle.

What is claimed is:
1. A stripper for the end of a film wound on a film reel, said stripper comprising
   a one-armed lever being pivotably mounted outside the film reel and being adapted to be swung between the flanges of the film reel, and
   a guide member being pivotably mounted at the end of said one-armed lever, said guide member having basically the shape of an isosceles triangle and being mounted on said one-armed lever at the vertex of said triangle, and having sufficient space between the ends of said triangle sides to permit the circumference of a 50-foot coil to rotate between said ends when said guide member is brought into contact with the top winding of said film coil.

References Cited

UNITED STATES PATENTS

| | | | |
|---|---|---|---|
| 1,213,771 | 1/1917 | Leen et al. | 242—76 |
| 2,578,283 | 12/1951 | Bornemann et al. | 242—76 |

NATHAN L. MINTZ, Primary Examiner